United States Patent [19]

Nieberle et al.

[11] 4,395,535

[45] Jul. 26, 1983

[54] PROCESS FOR THE MANUFACTURE OF PHENOL-ISOBUTYRALDEHYDE CONDENSATION PRODUCTS

[75] Inventors: Juergen Nieberle, Ludwigshafen; Karl-Clemens Peters, Bad Durkheim; Wolfgang Reuther, Heidelberg-Ziegelhausen; Heinz-Hilmar Bankowsky, Frankenthal, all of Fed. Rep. of Germany

[73] Assignee: BASF Aktiengesellschaft, Ludwigshafen, Fed. Rep. of Germany

[21] Appl. No.: 308,981

[22] Filed: Oct. 6, 1981

[51] Int. Cl.$^3$ ................................................ C08G 8/04
[52] U.S. Cl. ................................... 528/137; 528/139; 528/143; 528/144; 528/147; 528/165
[58] Field of Search ............... 528/165, 143, 144, 137, 528/147, 139

[56] References Cited

U.S. PATENT DOCUMENTS

| | | | |
|---|---|---|---|
| 2,176,951 | 10/1939 | Bannister | 528/165 X |
| 2,231,860 | 2/1941 | Swallen | 525/503 |
| 2,364,192 | 12/1944 | Charlton et al. | 528/165 |
| 3,501,552 | 3/1970 | Robins | 528/140 X |
| 4,276,209 | 6/1981 | Petersen et al. | 525/442 X |

FOREIGN PATENT DOCUMENTS

| | | |
|---|---|---|
| 2805684 | 8/1979 | Fed. Rep. of Germany . |
| 2805763 | 8/1979 | Fed. Rep. of Germany . |

*Primary Examiner*—Howard E. Schain
*Attorney, Agent, or Firm*—Bernhard R. Swick

[57] ABSTRACT

A process for the manufacture of condensation products of phenols and isobutyraldehyde by reacting the phenols and isobutyraldehyde at elevated temperature in a mole ratio of 0.5:1 to 1.5:1 in the presence of acid or compounds hydrolyzable to acids as catalysts, subsequent neutralization and removal of the resultant reaction water by distillation wherein the reaction products obtained in this manner are also subjected to a water-vapor distillation.

7 Claims, No Drawings

PROCESS FOR THE MANUFACTURE OF PHENOL-ISOBUTYRALDEHYDE CONDENSATION PRODUCTS

BACKGROUND OF THE INVENTION

1. Field of the Invention

This invention relates to a process for the manufacture of phenol-isobutyraldehyde condensation products. More specifically, this invention relates to such a process wherein problems presented by odor are eliminated or substantially reduced.

2. Prior Art

Condensation products of phenols and isobutyraldehyde are well known in the prior art. They are generally prepared by condensation of isobutyraldehyde with the phenol in the presence of acid catalysts, subsequent neutralization of the resultant products and removal of the resulting reaction water by distillation. Such process is described in German Published Applications Nos. 2,805,763 and 2,805,684.

A drawback of the above described manufacturing methods is the formation of by-products which are produced in quantities of up to 2 percent. These include, for instance, 2,2-dimethylcoumaran which result in considerable odor problems in many technical applications, for instance, in the printing ink industry.

Accordingly, it is a purpose of the instant invention to provide a process for the manufacture of phenol-isobutyraldehyde condensation products wherein odor problems are eliminated or substantially reduced.

SUMMARY OF THE INVENTION

In accordance with the present invention, the above stated purpose is surprisingly achieved by steam distillation wherein the undesirable by-products can be removed quantitatively from the end products following the above-described prior art process steps.

DESCRIPTION OF THE PREFERRED EMBODIMENTS

The possibility of solving the odor problem by steam distillation is surprising insofar as one skilled in the art would assume that under the conditions of such an operation—the effect of water and steam at temperatures above 100° C. for one or more hours—might chemically alter the products, e.g., by hydrolysis or repeated formation of the referenced dimethylcoumaran.

The condensation products, referred to herein as "resins" for simplicity sake, are initially produced in a well known manner such as described in the above-referenced publications. For this purpose, the appropriate phenol and the catalyst are placed in the reaction vessel and isobutyraldehyde added either continuously or in steps. This process may be implemented either without pressure or under pressure. The reactants may also be added to the reaction vessel during the course of the reaction, or all at once. The mole ratio of isobutyraldehyde to phenol is about 0.5:1 to 1.5:1, preferably about 0.7:1 to 1.3:1. The reaction temperatures are generally between about 80° and 120° C., and the reaction period is about 1 to 6 hours.

The softening points of the condensates obtainable in this manner, are generally between about 60° and 180° C. Suitable phenols which may be used for the manufacture of such phenol-isobutyraldehyde condensates particularly include those having the formula:

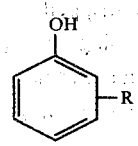

In this formula, R stands for a hydrogen, chlorine or bromine atom or an alkyl group having 1 to 18 carbon atoms in any of their isomeric forms which are in the o-, m- or p-position to the hydroxyl group, an alicyclic group with 5 to 18 carbon atoms, for instance, the cyclopentyl-, cyclohexyl-, methylcyclohexyl- or butylcyclohexyl group, an aromatic group or aralkyl group having 6 to 18 carbon atoms such as the phenyl-, α-methylbenzyl-, benzyl- or cumyl group. In addition to this, phenolic alkyl, cycloalkyl, aryl and aralkyl ketones as well as phenolic alkyl, cycloalkyl, aryl and aralkyl carboxylic acids may be used.

Suitable catalysts include acids or substances which may be hydrolyzed into acids, such as concentrated hydrochloric acid, sulfuric acid, aromatic sulfonic acids as well as halogenated phosphorus, such as phosphoric trichloride, phosphoric xychloride, and phosphoric pentachloride. The required catalyst quantity generally amounts to less than 5, particularly 0.1 to 1 percent by weight, relative to the amount of phenol plus isobutyraldehyde.

It is possible to use a solvent such as xylene which does not participate in the reaction and by which the resultant water can be separated. However, the water can also be removed by means of excess isobutyraldehyde as solvent. It is therefore more advantageous to work with mole ratios of isobutyraldehyde to phenol above 1. This guarantees that the phenol, as the more valuable starting product, will largely react. In addition to this, the softening points will then be above 90° C. which is of advantage for most applications.

After adding the isobutyraldehyde, the resultant water is removed to the desired degree of condensation at increased temperatures (80° to 120° C.). Following this, the reaction mixture is neutralized and all volatile products are removed by distillation under reduced pressure if necessary. It is simplest to neutralize the material with ammonia or amines but alkali lye may also be used. If the latter is used, the neutral salts must, in some cases, be removed if they are not desirable in the end product. The neutralization is necessary since large quantities of cleavage products will form upon heating the resultant novolak in the acid range, for instance, upon removing the high boiling impurities. These are primarily unsubstituted and/or substituted 2,2-dimethylcoumaran.

In accordance with this invention, the material is now subjected to a steam distillation during which the resultant by-products and/or possibly unreacted raw materials such as phenol are driven out of the resin. The distillation is advantageously carried out under normal pressure with steam having a temperature of up to 160° C. within a period of 1 to 3 hours.

EXAMPLE I

This example illustrates the manufacture of phenol-isobutyraldehyde condensation products in accordance with the prior art wherein 437.5 kilograms of phenol and 4.7 kilograms of p-tolulene sulfonic acid are placed in a reaction vessel and heated to 50° C. 368.5 kilograms of isobutyraldehyde are dripped into the resultant melt with the temperature rising to approximately 80° C. Following this, the water is removed at approximately 100° C. for 4 hours in a rotating evaporator. Subsequently, 20.6 kilograms of concentrated ammonia solution are added while the mixture is stirred and initially residual water and excess isobutyraldehyde are distilled off under normal pressure, and then the higher boiling components are removed by distillation under reduced pressure at temperatures up to 160° C.

EXAMPLE II

This example illustrates the practice of the instant invention. The initial procedure is the same as that described in Example I above. The ammonia solution necessary for the neutralization is added in two batches, 15.3 kilograms prior to the distillation under normal pressure and 5.3 kilograms prior to the vacuum distillation. As an additional step, in accordance with the instant invention, a steam distillation follows for a period of one hour.

The resins produced in the above examples are as follows:

|  | Example I (Comparative) | Example II (According to this Invention) |
|---|---|---|
| Softening Point according to DIN 52011 | 120° C. | 128° C. |
| Nonvolatile Component (2 hours 125° C.) | 98.4% | 99.8% |
| Color | dark reddish brown | yellow to light brown |
| Odor+ | odor | odor free |

+For the odor test, both resins were dissolved on a 50 percent basis in ethanol. The solution is applied to uncoated paper and is dried at room temperature for 5 minutes. After this, the samples were enclosed in a twist-off glass and the odor was evaluated.

The embodiments of the invention in which an exclusive privilege or property is claimed are defined as follows:

1. Process for the manufacture of condensation products of phenols and isobutyraldehyde wherein problems presented by odor are eliminated or substantially reduced, by reacting the phenol and isobutyraldehyde at an elevated temperature in a mole ratio of 0.5:1 to 1.5:1 in the presence of acid or compounds hydrolyzable to acids as catalysts, subsequent neutralization and removal of the resultant reaction water by a first distillation followed by subjection of the reaction products obtained in this manner to a second distillation, which second distillation is a steam distillation and the only steam distillation.

2. The process of claim 1 wherein said phenol and isobutyraldehyde are reacted at a temperature of about 80° C. to 120° C. for about 1 to 6 hours and said steam distillation is performed at a temperature up to about 160° C. for about 1 to 3 hours.

3. The process of claim 2 wherein said catalyst is an acid.

4. The process of claim 2 wherein said catalyst is a compound hydrolyzable to an acid.

5. The process of claim 2 wherein a solvent is employed to assist in the removal of water.

6. The process of claim 5 wherein the mole ratio of isobutyraldehyde to the phenol is greater than 1:1 whereby the excess isobutyraldehyde acts as the solvent.

7. The process of claim 1 wherein said first distillation step is a two-stage distillation, the first stage being under normal pressure and the second stage being under reduced pressure at temperatures up to 160° C.

* * * * *